US008366954B2

(12) United States Patent
Hoogboom et al.

(10) Patent No.: US 8,366,954 B2
(45) Date of Patent: Feb. 5, 2013

(54) SOLUTION FOR INCREASING WAFER SHEET RESISTANCE AND/OR PHOTOVOLTAIC CELL POWER DENSITY LEVEL

(75) Inventors: Joannes T. V. Hoogboom, Deventer (NL); Johannes A. E. Oosterholt, Hoogeveen (NL); Sabrina Ritmeijer, Enschede (NL); Lucas M. H. Groenewoud, Heino (NL)

(73) Assignee: Avantor Performance Materials, BV, Deventer (NL)

( * ) Notice: Subject to any disclaimer, the term of this patent is extended or adjusted under 35 U.S.C. 154(b) by 19 days.

(21) Appl. No.: 13/138,144

(22) PCT Filed: Jan. 11, 2010

(86) PCT No.: PCT/EP2010/000076
§ 371 (c)(1),
(2), (4) Date: Jul. 12, 2011

(87) PCT Pub. No.: WO2010/081661
PCT Pub. Date: Jul. 22, 2010

(65) Prior Publication Data
US 2011/0275223 A1 Nov. 10, 2011

(51) Int. Cl.
*B44C 1/22* (2006.01)
*C03C 15/00* (2006.01)
*C03C 25/68* (2006.01)
*C23F 1/00* (2006.01)
*C25F 3/00* (2006.01)

(52) U.S. Cl. ......................... 216/99; 252/79.3
(58) Field of Classification Search .................... 216/99; 252/79.3, 79.1
See application file for complete search history.

(56) References Cited

U.S. PATENT DOCUMENTS

| | | | |
|---|---|---|---|
| 4,113,551 A | 9/1978 | Bassous et al. ............... 156/662 |
| 5,466,389 A | 11/1995 | Ilardi et al. .................... 252/156 |
| 5,705,089 A | 1/1998 | Sugihara et al. ............. 252/79.1 |
| 5,855,811 A | 1/1999 | Grieger et al. ................ 252/79.3 |
| 6,044,851 A | 4/2000 | Grieger et al. ................... 134/1.3 |
| 6,083,849 A | 7/2000 | Ping ............................... 438/753 |
| 6,100,198 A | 8/2000 | Grieger et al. ................ 438/692 |
| 6,169,037 B1 | 1/2001 | Ping et al. ..................... 438/738 |
| 6,194,319 B1 | 2/2001 | Carstensen ................... 438/700 |
| 6,235,145 B1 | 5/2001 | Li et al. .......................... 156/345 |
| 6,265,309 B1 | 7/2001 | Gotoh et al. .................. 438/637 |
| 6,303,515 B1 | 10/2001 | Ping et al. ..................... 438/753 |
| 6,306,774 B1 | 10/2001 | Ping et al. ..................... 438/753 |
| 6,344,418 B1 | 2/2002 | Ping et al. ..................... 438/753 |
| 6,358,325 B1 | 3/2002 | Andreas ........................... 134/2 |
| 6,372,410 B1 | 4/2002 | Ikemoto et al. ............... 430/318 |
| 6,391,794 B1 | 5/2002 | Chen ............................. 438/745 |
| 6,468,951 B1 | 10/2002 | Grieger et al. ................ 510/175 |
| 6,572,453 B1 | 6/2003 | Wijekoon et al. ............... 451/56 |
| 6,589,439 B2 * | 7/2003 | Honda et al. .................. 216/107 |
| 6,632,743 B1 | 10/2003 | Grieger et al. ................ 438/692 |
| 7,419,945 B2 | 9/2008 | Hsu ............................... 510/175 |
| 2001/0016425 A1 | 8/2001 | Ping et al. ..................... 438/743 |
| 2001/0052351 A1 | 12/2001 | Brown et al. ...................... 134/2 |
| 2001/0056052 A1 | 12/2001 | Aoki et al. ..................... 510/175 |
| 2002/0137357 A1 | 9/2002 | Chen et al. .................... 438/745 |
| 2003/0017962 A1 | 1/2003 | Naghshineh et al. ......... 510/499 |
| 2003/0153170 A1 | 8/2003 | Wada ............................. 438/595 |
| 2003/0207777 A1 | 11/2003 | Naghshineh et al. ......... 510/175 |
| 2003/0211678 A1 | 11/2003 | Chen et al. .................... 438/200 |
| 2004/0013858 A1 | 1/2004 | Hacker et al. .............. 428/195.1 |
| 2004/0161933 A1 | 8/2004 | Takashima et al. ........... 438/689 |
| 2005/0095840 A1 | 5/2005 | Bhanap et al. ................ 438/623 |
| 2005/0189015 A1 | 9/2005 | Rohatgi et al. ................ 136/261 |
| 2006/0057837 A1 | 3/2006 | Bhanap et al. ................ 438/623 |
| 2006/0057855 A1 | 3/2006 | Ramos et al. ................. 438/710 |
| 2006/0078827 A1 | 4/2006 | Hacker et al. ................. 430/311 |
| 2006/0219660 A1 | 10/2006 | Nishimura et al. ............. 216/67 |
| 2007/0023396 A1 | 2/2007 | Fucsko et al. .................. 216/99 |
| 2007/0099806 A1 | 5/2007 | Stewart et al. ................ 510/175 |
| 2007/0145009 A1 | 6/2007 | Fucsko et al. .................. 216/83 |
| 2007/0190735 A1 | 8/2007 | Hacker et al. ................. 438/311 |
| 2007/0207622 A1 | 9/2007 | Rana et al. .................... 438/745 |
| 2007/0262048 A1 | 11/2007 | Rana et al. ....................... 216/6 |
| 2008/0166842 A1 | 7/2008 | Lee ................................ 438/243 |
| 2010/0216315 A1 | 8/2010 | Yaguchi et al. ............... 438/745 |

FOREIGN PATENT DOCUMENTS

WO WO 2008/157345 A2 12/2008

OTHER PUBLICATIONS

Patent Abstracts of Japan, Publication No. 2005-129714, Date of publication of applicaton May 19, 2005.
Patent Abstracts of Japan, Publication No. 2005-217620, Date of publication of applicaton Aug. 11, 2005.
Bentzen, A. (2006). Phosphorus Diffusion and Gettering in Silicon Solar Cells. Thesis, Department of Physics, University of Oslo.
Bentzen, A. and A. Holt (2005). "Correspondence between sheet resistance and emitter profile of phosphorus diffused emitters from a spray-on dopant." Conference Record of the IEEE Photovoltaic Specialists Conference $31^{st}$: 1153-1156.
Tool, C. J. J., M. Koppes, et al. (2006). "Almost 1% absolute efficiency increase in mc-Si solar cell manufacturing with simple adjustments to the processing sequence." $21^{st}$ European Photovoltaic Solar Energy Conference and Exhibition. Dresden, GE.
Kern, W. and D. A. Puotinen (1970). "Cleaning solutions based on hydrogen peroxide for use in silicon semiconductor technology." RCA Review: 187-206.
Kern, W. (1986). "Wet-chemical etching of SiO2 and PSG films, and an etching-induced defect in glass-passivated integrated circuits." RCA Review 47(2): 186-202.
Jakob, P., Y. J. Chabal, et al. (1992). "Kinetic model of the chemical etching of Si (111) surfaces by buffered HF solutions." Surface Science 275: 407-413.
Kikuyama, H., M. Waki, et al. (1992). "Etching rate and mechanism of doped oxide in buffered hydrogen fluoride solution." Journal of the Electrochemical Society 139(8), 2239.

(Continued)

*Primary Examiner* — Roberts Culbert
(74) *Attorney, Agent, or Firm* — Hoffmann & Baron, LLP

(57) ABSTRACT

Treating thin film amorphous or mono- or multi-crystalline silicon wafer substrate for use in a photovoltaic cell, the wafer substrate having at least one of a pn- or np junction and a partial phosphosilicate or borosilicate glass layer on a top surface of the wafer substrate, to increase at least one of (a) the sheet resistance of he wafer and (b) the power density level of the photovoltaic cell made from said wafer. The treatment solution being an acidic treatment solution of a buffered oxide etch (BOE) solution of at least one tetraalkylammonium hydroxide, acetic acid, at least one non-ionic surfactant, at least one metal chelating agent, a metal free source of ammonia, a metal free source, of fluoride ions, and water, mixed with an oxidizer solution and optionally water.

23 Claims, No Drawings

OTHER PUBLICATIONS

Monk, D. J., D. S. Soane, et al. (1994). "Hydrofluoric acid etching of silicon dioxide sacrificial layers. I. Experimental observations." Journal of the Electrochemical Society 141(1): 264-9.

Tenney, A. S. and M. Ghezzo (1973). "Etch rates of doped oxides in solutions of buffered hydrogen fluoride." Journal of the Electrochemical Society 120(8): 1091-5.

Teo, B. K., W. W. Chen, et al. (2005) "Three-Dimensional Etching Profiles and Surface Speciations (via Attenuated Total Reflection-Fourier Transform Infrared Spectroscopy) of Silicon Nanowires in NH4F-Buffered HF Solutions: A Double Passivation Model." Journal of Physical Chemistry B 109(46): 21716-21724.

Bentzen, A. et al, "High Concentration in-diffusion of phosphorus in Si from a spray-on source." Journal of Applied Physics 99, 064502 (2006), 9pages.

Bentzen, A. et al, "Influence of Temperature During Phosphorus Emitter Diffusion From a Spray-on Source in Multicrystalline Silicon Solar Cell Processing." Progress in Photovoltaics: Research and Applications (2006) 9 pages.

Bentzen, A. et al, "Gettering of transition metal impurities during phosphorus emitter diffusion in multicrystalline silicon solar cell processing." Journal of Applied Physics 99, 093509 (2006) 5 pages.

Bentzen, A., et al, Understanding Phosphorus Emitter Diffusion in Silicon Solar Cell Processing, 21$^{st}$ European Photovoltaic Solar Energy Conference, Sep. 4-8, 2006, Dresden, Germany, 4 pages.

Bentzen, A., et al, "The influence of structural defects on phosphorus diffusion in multicrystalline silicon." Solar Energy Materials and Solar Cells, 90:3193-3198, 2006.

Bentzen, A., et al, "Phosphorus diffusion and gettering in multicrystalline silicon solar cell processing." Proceedings of the 19$^{th}$ European Photovoltaic Colar Energy Conference, p. 935-938, 2004.

Bentzen, A., et al, "Recombination life-time and trap density variations in multicrystalline silicon wafers through the block." Proceedings of the Thirty-First IEEE Photovoltaic Specialists Conference, pp. 1074-1077, 2005.

Bentzen, A., et al, "High trap densities in wafers from regions of reduced lifetime in multicrystalline silicon blocks." Technical Digest of the 15$^{th}$ International Photovoltaic Science and Engineering Conference, pp. 879-880, 2005.

Jeon, M. S., et al: "Performance improvement in simplified processing for screen-printed mc-Si solar cells." Conference of the Thrity-First IEEE Photovoltaic Specialist Conference (IEEE Cat. No. 05CH37608) IEEE Piscataway, NJ, USA, Jan. 3, 2005, pp. 1096-1099.

* cited by examiner

SOLUTION FOR INCREASING WAFER SHEET RESISTANCE AND/OR PHOTOVOLTAIC CELL POWER DENSITY LEVEL

FIELD OF THE INVENTION

This invention relates to an acidic treatment composition and to the use of such acidic treatment composition in a method of treating a thin film amorphous or mono- or multi-crystalline silicon wafer substrate for use in a photovoltaic cell, the wafer substrate having at least one of a pn- or np junction and a partial phosphosilicate or borosilicate glass layer on a top surface of the wafer substrate, to provide increased sheet resistance of a wafer and/or power density a photovoltaic cell made from said wafer.

BACKGROUND TO THE INVENTION

Silicon-based solar cells, or photovoltaic cells, require several processing steps in order to be able to convert incident light into current. One of these steps involves the generation of an emitter, which is most commonly accomplished by the thermal drive-in of phosphorous into a boron-doped silicon wafer. This process results in the generation of a so-called dead layer, which gives high recombination rates of the generated charges and is detrimental to the efficiency and power density level of the solar cell. Additionally, this process produces a so-called phosphosilicate glass (PSG) layer on top of the wafer, which contains phosphorous, silicon and oxygen and this PSG layer has to be removed in order to be able to proceed in cell manufacture. After the thermal drive-in process, the phosphorous depth profile shows a plateau of high-concentration extending from the surface to several tens or hundreds of nanometers deep, depending on process conditions. Ideally, the concentration near the surface would be high (i.e. $10^{20-21}$ atoms/cm$^3$) in order to be able to contact the electrodes well.

A principal goal of multi crystalline photovoltaic cell manufacturers is to reduce the cost of the energy delivered by their solar cells. This can generally be accomplished in one of two ways, either reduction in overall cell manufacturing costs and/or improvement in solar cell conversion efficiency. In an effort to achieve the latter objective current manufacturing processes apply a post-emitter etch after the phosphorous diffusion, which removes the PSG layer by dipping the wafer in HF. Previous experiments have shown that an additional treatment after the HF-dip can result in higher cell efficiencies, up to 0.3% absolute. Currently, a product of Mallinckrodt Baker, Inc., namely product PV-160, is used in this additional step. However, use of this product generally requires processing of the wafer substrate in a heated bath (70° C. or higher) of the product.

It is highly desirable that compositions be available that are capable of producing higher power density in solar cells in equal or lesser processing times and at reduced temperatures by improved etching of remnants of the PSG layer as well as deeper etching of the dead layer, compared with results obtained with the currently used PV-160 product.

SUMMARY OF THE INVENTION

In a first embodiment the invention provides a method of treating a thin film amorphous or mono- or multi-crystalline silicon wafer substrate for use in a photovoltaic cell to increase at least one of (a) the sheet resistance of the wafer and (b) the power density of the photovoltaic cell made from the wafer, the wafer substrate having a pn- or np junction and/or partial phosphosilicate and/or borosilicate glass layer on a top surface of the wafer substrate, the treatment method comprising contacting the wafer substrate with an acidic treatment solution for a time and at a temperature sufficient to increase at least one of (a) the sheet resistance of the wafer and (b) power density of the photovoltaic cell made from said wafer, the solution comprising:

a buffered oxide etch (BOE) solution of:
  from about 0.1 to about 20% by weight of at least one tetraalkylammonium hydroxide,
  from about 0.1 to about 5% by weight acetic acid,
  from about 0.1 to about 5% by weight of at least one non-ionic surfactant,
  about 0.1 to about 5% by weight of at least one metal chelating agent,
  from about 0.1 to about 20% by weight of a metal free source of ammonium ions,
  from about 0.01 to about 20% by weight of a metal free source of fluoride ions, balance water to 100%,
mixed with oxidizer and optionally water in a ratio by volume of oxidizer/water/BOE solution of 0.01-10/0-100/1. The wafer with the emitter is inclusive of both p- and n-source silicon types.

While the treatment can increase either the sheet resistance of the wafer or the power density of the photovoltaic cell it preferably increases both. Additionally, the treatment may also increase the efficiency of a photovoltaic cell made from this wafer.

In a further embodiment of this invention there is provided an acidic treatment solution for treating a thin film amorphous or mono- or multi-crystalline silicon wafer substrates for use in a photovoltaic cell to increase at least one of (a) the sheet resistance of the wafer and (b) the power density level of the photovoltaic cell made from said wafer, the wafer substrate having a pn- or np junction and/or partial phosphosilicate and/or borosilicate glass layer on a top surface of the wafer substrate, wherein the acidic treatment solution comprises a mixture of:

a buffered oxide etch (BOE) solution of:
  from about 0.1 to about 20% by weight of at least one tetraalkylammonium hydroxide,
  from about 0.1 to about 5% by weight acetic acid,
  from about 0.1 to about 5% by weight of at least one non-ionic surfactant,
  about 0.1 to about 5% by weight of at least one metal chelating agent,
  from about 0.1 to about 20% by weight of a metal free source of ammonium ions,
  from about 0.01 to about 20% by weight of a metal free source of fluoride ions,
  balance water to 100%,
mixed with oxidizer and optionally water in a ratio by volume of oxidizer/water/BOE solution of 0.01-10/0-100/1. The wafer with the emitter is inclusive of both p- and n-source silicon types.

In both of these embodiments the amount by weight of the tetraalkylammonium chloride in the BOE solution is preferably 0.5 to 15%, more preferably 1 to 10%, still more preferably 1.5 to 8%, and most preferably 2 to 4%, and especially 3.1%.

The amount by weight of acetic acid is preferably 0.5 to 4%, more preferably 0.8 to 3%, still more preferably 1 to 2%, most preferably 1 to 1.5%, and especially 1-2%.

For the non-ionic surfactant the amount by weight is preferably 0.2 to 4%, more preferably 0.3 to 2%, still more preferably 0.5 to 1%, most preferably 0.7 to 0.9%, and especially 0.8%.

For the chelating agent the amount by weight is preferably 0.2 to 4%, more preferably 0.3 to 3%, still more preferably 0.4 to 1%, most preferably 0.5 to 0.8%, and especially 0.6%.

For the source of the ammonium ions, the amount by weight is preferably 0.2 to 10%, more preferably 0.3 to 5%, still more preferably 0.5 to 2%, most preferably 0.6 to 1%, and especially 0.8%.

For the source of fluoride ions, the amount by weight is preferably 1 to 10%, more preferably 0.5 to 5%, still more preferably 1.0 to 3%, most preferably 1.5 to 2.5%, and especially 2.1%.

While the treatment can increase either the sheet resistance of the wafer or the power density of a photovoltaic cell made from said wafer it preferably increases both. Additionally, the treatment may also increase the efficiency of a photovoltaic cell made from this wafer.

In a preferred embodiment of the invention the treatment occurs at a temperature of from about 20° to less than 70° C.

In another preferred embodiment of this invention the BOE solution has a pH of from about 3 to less than 7, preferably a pH of from about 3 to about 6, and more preferably a pH of from about 4.3 to about 5.

In a still further preferred embodiment of this invention the oxidizer comprises hydrogen peroxide. Generally the oxidizer is in aqueous solution, (0.01% to 50%, more preferably 0.1% to 30%, and even more preferably about 30% aqueous solution) of water and hydrogen peroxide in any suitable ratio, but generally in a ratio of from about 6/10.2 to about 6/1.

In yet another preferred embodiment of this invention the BOE solution comprises tetramethylammonium hydroxide as the tetraalkylammonium hydroxide, 3,5-dimethylhex-1-yn-3-ol as the at least one surfactant, and EDTA as the at least one metal chelating agent, and the oxidizer solution comprises hydrogen peroxide and water.

In yet another preferred embodiment of this invention the BOE solution comprises about 3.1% tetramethylammonium hydroxide, about 1.2% acetic acid, about 2.1% HF, about 0.8% 3,5-dimethylhex-1-yn-3-ol about 0.8% ammonium hydroxide, about 0.6% EDTA, about 91.5% water, wherein the percentages are by weight.

In another preferred embodiment of this invention the BOE solution is mixed with oxidizer solution in a ratio of BOE/water/hydrogen peroxide of about 1/6/0.2. In another preferred embodiment of this invention the BOE solution is mixed with oxidizer solution in a ratio of BOE/water/hydrogen peroxide of about 1/6/0.8. In another preferred embodiment of this invention the BOE solution is mixed with oxidizer solution in a ratio of BOE/water/hydrogen peroxide of about 1/6/1.

In still yet other preferred embodiments of this invention the embodiments comprise one or more of the combinations of the aforementioned preferred embodiments.

In addition, the current invention can be used at a processing temperature of from about 20° C. to about 40° C., which is lower than the current industry standard of 70° C.

DETAILED DESCRIPTION OF THE INVENTION

By this invention there is provided a method of treating a thin film amorphous or mono- or multi-crystalline silicon wafer substrate for use in a photovoltaic cell to improve at least one of (a) the sheet resistance of the wafer and (b) the power density of the photovoltaic cell made from said wafer, the wafer substrate having a pn- or np junction and/or partial phosphosilicate and/or borosilicate glass layer on a top surface of the wafer substrate, the method comprising contacting the wafer substrate with an acidic treatment solution for a time and at a temperature sufficient to increase at least one of (a) the sheet resistance and (b) power density of the photovoltaic cell, the acidic treatment solution comprising:

a buffered oxide etch (BOE) solution of:
from about 0.1 to about 20% by weight of at least one tetraalkylammonium hydroxide,
from about 0.1 to about 5% by weight acetic acid,
from about 0.1 to about 5% by weight of at least one non-ionic surfactant,
about 0.1 to about 5% by weight of at least one metal chelating agent,
from about 0.1 to about 20% by weight of a metal free source of ammonium ions,
from about 0.01 to about 20% by weight of a metal free source of fluoride ions, balance water to 100%,
mixed with oxidizer and optionally water in a ratio by volume of oxidizer/water/BOE solution of 0.01-10/0-100/1. The wafer with the emitter is inclusive of both p- and n-source silicon types.

While the treatment can increase either the sheet resistance of the wafer or the power density of a photovoltaic cell made from said wafer it preferably increases both. Additionally, the treatment may also increase the efficiency of a photovoltaic cell made from this wafer.

Similarly, the invention provides a solution for treating a thin film amorphous or mono- or multi-crystalline silicon wafer substrates for use in a photovoltaic cell to increase at least one of (a) the sheet resistance of the wafer and (b) the power density level of the photovoltaic cell made from said wafer, the wafer substrate having a pn- or np junction and/or partial phosphosilicate and/or borosilicate glass layer on a top surface of the wafer substrate, wherein the acidic treatment solution comprises a mixture of:

a buffered oxide etch (BOE) solution of:
from about 0.1 to about 20% by weight of at least one tetraalkylammonium hydroxide,
from about 0.1 to about 5% by weight acetic acid,
from about 0.1 to about 5% by weight of at least one non-ionic surfactant,
about 0.1 to about 5% by weight of at least one metal chelating agent,
from about 0.1 to about 20% by weight of a metal free source of ammonium ions,
from about 0.01 to about 20% by weight of a metal free source of fluoride ions,
balance water to 100%,
mixed with oxidizer and optionally water in a ratio of oxidizer/water/BOE solution of 0.01-10/0-100/1. The wafer with the emitter is inclusive of both p- and n-source silicon types.

While the treatment can increase either the sheet resistance of the wafer or the power density of the photovoltaic cell made from said wafer, it preferably increases both. Additionally, the treatment may also increase the efficiency of a photovoltaic cell made from this wafer.

In the process of this invention the step employing the acidic treatment solution is utilized on the photovoltaic cell wafer substrate after the phosphosilicate or borosilicate glass removal (incomplete removal) with BF and just prior to another HF dip and subsequent AntiReflective Coating (ARC), such as for example SiNxH deposition. The process comprises exposing the wafer substrate to the acidic treatment solution, such as by immersing the wafer substrate in a heated bath of the solution for a time and at a temperature sufficient to increase at least one of (a) the sheet resistance of the wafer and (b) the power density of the photovoltaic cell made from said wafer. The contact of the wafer substrate with the acidic treatment solution will generally be for a period of from about 0.01 to about 20 minutes, preferably from about 0.5 to about 5 minutes, and more preferably for about 1 minute. The temperature of the solution will generally be of from about 20° C. to less than about 70° C., preferably from about 20° C. to about 60° C., more preferably from about 20° to about 40° C., even more preferably at about 40° C.

Suitable for use in the acidic treatment compositions of this invention there may be mentioned tetraalkylammonium hydroxides or salts of the formula $[(R)_4N^+]_p[X^{-q}]$, where each R is independently a substituted or unsubstituted alkyl, preferably alkyl of from 1 to 22, and more preferably 1 to 6, most preferably 1 carbon; and X=OH or a suitable salt anion, such as carbonate and the like; p and q are equal and are integer of from 1 to 3. The most preferable of these are tetramethyl ammonium hydroxide and trimethyl-2-hydroxyethyl ammonium hydroxide (choline). Examples of other usable quaternary ammonium hydroxides include: trimethyl-3-hydroxypropyl ammonium hydroxide, trimethyl-3-hydroxybutyl ammonium hydroxide, trimethyl-4-hydroxybutyl ammonium hydroxide, triethyl-2-hydroxyethyl ammonium hydroxide, tripropyl-2-hydroxyethyl ammonium hydroxide, tributyl-2-hydroxyethyl ammonium hydroxide, dimethylethyl-2-hydroxyethyl ammonium hydroxide, dimethyldi(2-hydroxyethyl) ammonium hydroxide, monomethyltri(2-hydroxyethyl) ammonium hydroxide, tetraethyl ammonium hydroxide, tetrapropyl ammonium hydroxide, tetrabutyl ammonium hydroxide, monomethyltriethyl ammonium hydroxide, monomethyltripopyl ammonium hydroxide, monomethyltributyl ammonium hydroxide, monoethyltrimethyl ammonium hydroxide, monoethyltributyl ammonium hydroxide, dimethyldiethyl ammonium hydroxide, dimethyldibutyl ammonium hydroxide, and the like and mixtures thereof.

The metal free source of ammonium ions can be any suitable metal free ammonium salt, such as for example, ammonium hydroxide, ammonium fluoride, ammonium chloride, ammonium nitrate and the like, but is preferably ammonium hydroxide. The metal free source of fluoride ions can be any suitable metal free fluoride compound, such as for example, hydrogen fluoride, ammonium fluoride, quaternary ammonium fluorides such as tetramethylammonium fluoride. Preferably the metal free source of fluoride ions is HF. In another preferred embodiment both the ammonium ions and the fluoride ions may be provided by one compound, namely ammonium fluoride.

The acidic treatment compositions of this invention may contain any suitable nonionic surfactant. Among the various suitable nonionic surfactant useful in the treatment compositions of this invention there may be mentioned, for example, low foaming nonionic surfactants such as alkynol surfactants, fluorinated surfactants such as fluorinated alkyl alkoxylates such as Fluorad® FC-171, fluorinated alkylesters such as FC-430 and FC-431 and fluorinated polyoxyethylene alkanols such as Fluorad® FC-170C, aliphatic acid esters of polyhydric alcohols, polyoxyethylene monoalkyl ethers, polyoxyethylene diols, siloxane type surfactants and alkylene glycol monoalkyl ethers such as butoxypropanol. Preferred for use as nonionic surfactants in the alkaline treatment compositions of this invention are alkynol surfactants, especially 3,5-dimethylhex-1-yn-3-ol (Surfynol®-61) or any other Surfynol® surfactant, fluorinated alkyl polyoxyethylene ethanols, especially Fluorad® FC-170C and alkylene glycol monoalkyl ethers, especially butoxypropanol.

Any suitable metal chelating agents to increase the capacity of the formulation to retain metals in solution may be employed in the acidic treatment compositions of this invention. Typical examples of chelating agents for this purpose are the following organic acids and their salts: ethylenediaminetetraacetic acid (EDTA), butylenediaminetetraacetic acid, cyclohexane-1,2-diaminetetraacetic acid (CyDTA) diethylenetriaminepentaacetic acid, ethylenediaminetetrapropionic acid, (hydroxyethyl)ethylenediaminetriacetic acid (HEDTA), methyliminodiacetic acid, propylenediaminetetraacetic acid, nitrolotriacetic acid (NTA), citric acid, tartaric acid, gluconic acid, saccharic acid, glyceric acid, oxalic acid, phthalic acid, maleic acid, mandelic acid, malonic acid, lactic acid, salicylic acid, catechol, 8-hydroxyquinoline, N,N,N',N'-ethylenediaminetetra (methylenephosphonic acid, and the like.

Any suitable oxidizing agent may be employed, such as, for example, oxidizing anions, such as, for example, peroxides, nitric acid and its salts and nitrates, persulfate, periodate, perbromate, perchlorate, iodate, bromate, and chlorate salts of ammonium. Preferred are peroxides and particularly hydrogen peroxide.

The acidic treatment compositions of this invention may be produced by mixing the required components in a suitable vessel to form the compositions. Preferably, the required components of the composition are added to the vessel in a sequence of base/acid/base/acid in order to minimize any possible heat from a reaction of the components.

In solar cell manufacturing, however, the product will have to etch not only silicon oxide, but silicon and phosphorous as well. In order to achieve this, the BOE is combined with hydrogen peroxide as an oxidizing agent. This implies that the BOE etches away silicon oxide, whilst the oxidizing agent generates new silicon oxide on the surface, in a continued process of etch-oxidation. In addition, the oxidizing agent oxidizes the phosphorous present in the layer, thereby solubilizing it. The etched species (including, but not limited to metal impurities) are partly kept in solution by the addition of a chelating agent, whereas the wettability of the surface (i.e. the efficiency with which the oxidizing agent can oxidize the surface) is improved by the addition of a surfactant. The addition of acetic acid ensures a doubly buffered system, which aids in process stability.

The invention is illustrated by, but not limited to, the following examples. In the examples the percentages are by weight.

EXAMPLE 1

A set of 25 neighboring multi-crystalline silicon wafers of a size of about 15.6×15.6 cm$^2$ with a thickness of about 180-200 μm were processed in an industrial type in-line photovoltaic cell manufacturing sequence. After emitter deposition and phosphorous glass removal with HF, the wafers with a partial phosphosilicate glass layer on a top surface of the wafer substrates, the wafers were contacted with (1) an acidic treatment solution of this invention at 40° C., (2) the prior art PV-160 solution at the 70° C. required for such solution, or (3) no treatment solution as a control. The acidic treatment solution of the invention comprised a BOE solution of about 3.1% tetramethylammonium hydroxide, about 1.2% acetic acid, about 2.1% HF, about 0.8% 3, 5-dimethylhex-1-yn-3-ol about 0.8% ammonium hydroxide, about 0.6% EDTA, about 91.5% water. This BOE solution was mixed with hydrogen peroxide oxidizer solution in a ratio of BOE/water/30% hydrogen peroxide solution of about 1/6/0.2. The prior art PV-160 solution was also employed mixed with hydrogen peroxide oxidizer solution in a ratio of BOE/water/30% hydrogen peroxide solution of about 1/6/0.2. Thereafter, the treated wafers were subjected to a wet chemical treatment in a solution of HF of 1 percent by weight at room temperature for 1 minute, followed by the usual customary photovoltaic manufacturing steps to produce the desired photovoltaic cells. Electrode firing settings were kept constant whilst processing the different groups and were set at the optimal firing setting for the prior art group. The cells were the measured for their power density level (unit mW/cm$^2$, defined as the product of the short-circuit current density and the open circuit voltage, Jsc×Voc). The results are set forth in the following Table 1.

TABLE 1

| Treatment Composition | Short-circuit current density (Jsc) mA/cm$^2$ | Open circuit voltage (Voc) V | Power density (Jsc × Voc) mAV/cm$^2$ | Increase in Sheet Resistance (Ohm/square) |
|---|---|---|---|---|
| Inventive Composition | 33.37 | 0.607 | 20.25 | 5 |
| PV-160 | 33.33 | 0.608 | 20.27 | 3 |
| None | 32.96 | 0.604 | 19.91 | 0 |

EXAMPLE 2

A set of 25 neighboring multi-crystalline silicon wafers of a size of about 15.6×15.6 cm$^2$ with a thickness of about 180-200 μm were processed in an industrial type in-line photovoltaic cell manufacturing sequence. After emitter deposition and phosphorous glass removal with HF, the wafers with a partial phosphosilicate glass layer on a top surface of the wafer substrates, the wafers were contacted with (1) an acidic treatment solution of this invention at 40° C., (2) the prior art PV-160 solution at the 70° C. required for such solution. The treatment solution of the invention comprised a BOE solution of about 3.1% tetramethylammonium hydroxide, about 1.2% acetic acid, about 2.1% HF, about 0.8% 3,5-dimethylhex-1-yn-3-ol about 0.8% ammonium hydroxide, about 0.6% EDTA, about 91.5% water. This BOE solution was mixed with hydrogen peroxide oxidizer solution in a ratio of BOE/water/30% hydrogen peroxide of about 1/6/0.8. The prior art PV-160 solution was also employed mixed with hydrogen peroxide oxidizer solution in a ratio of BOE/water/30% hydrogen peroxide solution of about 1/6/0.2. Thereafter, the treated wafers were subjected to a wet chemical treatment in a solution of HF of 1 percent by weight at room temperature for 1 minute, followed by the usual customary photovoltaic manufacturing steps to produce the desired photovoltaic cells. Electrode firing settings were kept constant whilst processing the different groups and were set at the optimal firing setting for the prior art group. The cells were the measured for their power density level (unit mW/cm$^2$, defined as the product of the short-circuit current density and the open circuit voltage, Jsc×Voc). The results are set forth in the following Table 2.

TABLE 2

| Treatment Composition | Short-circuit current density (Jsc) mA/cm$^2$ | Open circuit voltage (Voc) V | Power density (Jsc × Voc) mAV/cm$^2$ | Increase in Sheet Resistance (Ohm/square) |
|---|---|---|---|---|
| Inventive Composition | 33.50 | 0.600 | 20.10 | 8.5 |
| PV-160 | 33.33 | 0.598 | 19.93 | 1.5 |

EXAMPLE 3

A set of 25 neighboring multi-crystalline silicon wafers of a size of about 15.6×15.6 cm$^2$ with a thickness of about 180-200 μm were processed in an industrial type in-line photovoltaic cell manufacturing sequence. After emitter deposition and phosphorous glass removal with HF, the wafers with a partial phosphosilicate glass layer on a top surface of the wafer substrates, the wafers were contacted with (1) an acidic treatment solution of this invention at 25° C., 30° C. and 40° C., (2) the prior art PV-160 solution at the 70° C. required for such solution, or (3) no solution as a control. The acidic treatment solution of the invention comprised a BOE solution of about 3.1% tetramethylammonium hydroxide, about 1.2% acetic acid, about 2.1% HF, about 0.8% 3,5-dimethylhex-1-yn-3-ol about 0.8% ammonium hydroxide, about 0.6% EDTA, about 91.5% water. This BOE solution was mixed with hydrogen peroxide oxidizer solution in a ratio of BOE/water/30% hydrogen peroxide solution of about 1/6/1. The prior art PV-160 solution was also employed mixed with hydrogen peroxide oxidizer solution in a ratio of BOE/water/hydrogen peroxide solution of about 1/6/0.2. Thereafter, the treated wafers were subjected to a wet chemical treatment in a solution of HF of 1 percent by weight at room temperature for 1 minute, followed by the usual customary photovoltaic manufacturing steps to produce the desired photovoltaic cells. Electrode firing settings were kept constant while processing the different groups and were set at the optimal firing setting for the prior art group. The results are set forth in the following Table 3.

TABLE 3

| Treatment Composition | Efficiency (%) | Open-Circuit Voltage ($V_{OC}$) V | Short-Circuit Current Density ($J_{SC}$) mA/cm$^2$ | Fill Factor (%) | Mean Power density (Jsc × Voc) mAV/cm$^2$ | Increase in Sheet Resistance (Ohm/square) |
|---|---|---|---|---|---|---|
| PV-160 | 14.74 | 0.60 | 7.93 | 74.81 | 4.80 | 1.10 |
| None | 14.75 | 0.60 | 7.89 | 75.55 | 4.75 | 0.70 |
| Inventive Composition at 25° C. | 14.86 | 0.60 | 7.91 | 75.58 | 4.78 | 1.80 |

TABLE 3-continued

| Treatment Composition | Efficiency (%) | Open-Circuit Voltage ($V_{OC}$) V | Short-Circuit Current Density ($J_{SC}$) mA/cm² | Fill Factor (%) | Mean Power density (Jsc × Voc) mAV/cm² | Increase in Sheet Resistance (Ohm/square) |
|---|---|---|---|---|---|---|
| Inventive Composition at 30° C. | 14.71 | 0.60 | 7.91 | 74.85 | 4.78 | 2.20 |
| Inventive Composition at 40° C. | 14.74 | 0.61 | 7.94 | 74.56 | 4.81 | 4.50 |

As shown by the results the composition of this invention increased the sheet resistance and/or power density level of the cell significantly over the control. By changing the mixing ratio, notably by increasing the amount of hydrogen peroxide, the composition of this invention showed equal or superior power density compared to the PV-160. However, the composition of this invention was able to do so in a temperature range of 20° C. to 40° C. whereas the PV-160 composition required a temperature of 70° C. to do that.

While the invention has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

The invention claimed is:

1. A method of treating a thin film amorphous or mono- or multi-crystalline silicon wafer substrate for use in a photovoltaic cell, the wafer substrate having at least one of a pn- or np junction and a partial phosphosilicate or borosilicate glass layer on a top surface of the wafer substrate, to increase at least one of (a) the sheet resistance and (b) the power density of the photovoltaic cell, the method comprising contacting the wafer substrate with an acidic treatment solution for a time and at a temperature sufficient to increase at least one of (a) the sheet resistance of the wafer and (b) the power density of the photovoltaic cell made from said wafer, the acidic treatment solution comprising:
a buffered oxide etch (BOE) solution of:
from about 0.1 to about 20% by weight of at least one tetraalkylammonium hydroxide,
from about 0.1 to about 5% by weight acetic acid,
from about 0.1 to about 5% by weight of at least one non-ionic surfactant,
about 0.1 to about 5% by weight of at least one metal chelating agent,
from about 0.1 to about 20% by weight of a metal free source of ammonium ions,
from about 0.01 to about 20% by weight of a metal free source of fluoride ions,
balance water to 100%,
mixed with a solution of oxidizer and optionally water in a ratio of oxidizer solution /water/BOE solution of 0.01-10/0-100/1.

2. A method according to claim 1 wherein the treatment occurs at a temperature of from about 20° to about 70° C.

3. A method according to claim 1 wherein BOE solution has a pH of from about 3 to about 6.

4. A method according to claim 3 wherein the BOE solution has a pH of from about 4.3 to about 5.

5. A method according to claim 1 wherein the oxidizer solution comprises hydrogen peroxide.

6. A method according to claim 1 wherein the BOE solution comprises tetramethylammonium hydroxide as the tetraalkylammonium hydroxide, 3,5-dimethylhex -1-yn3-ol as the at least one surfactant, and EDTA as the at least one metal chelating agent, and the oxidizer solution comprises hydrogen peroxide and water.

7. A method according to claim 6 wherein the BOE solution comprises about 3.1% tetramethylammonium hydroxide, about 1.2% acetic acid, about 2.1% HF, about 0.8% 3,5-dimethylhex -1-yn-3-ol about 0.8% ammonium hydroxide, about 0.6% EDTA, about 91.5% water.

8. A method according to claim 7 wherein the BOE solution is mixed with oxidiser solution in a ratio of BOE/water/30% hydrogen peroxide in the range 1/6/0.2-1.0.

9. A method according to claim 7 wherein the BOE solution is mixed with oxidizer solution in a ratio of BOE/water/30% hydrogen peroxide solution of about 1/6/0.8.

10. A method according to claim 7 wherein the BOE solution is mixed with oxidizer solution in a ratio of BOE/water/30% hydrogen peroxide solution of about 1/6/1.

11. A method according to claim 7 wherein the BOE solution is mixed with oxidizer solution in a ratio of BOE/water/30% hydrogen peroxide solution of about 1/6/0.2.

12. A method according to claim 11 wherein the treatment occurs at a temperature of from about 20° to about 70° C.

13. A method according to claim 1 wherein the treatment also improves the efficiency of a photovoltaic cell made from this wafer.

14. An acidic treatment solution for treating a thin film amorphous or mono- or multi-crystalline silicon wafer substrates for use in a photovoltaic cell, the wafer substrate having at least one of a pn- or np junction and a partial phosphosilicate or borosilicate glass layer on a top surface of the wafer substrate, to increase at least one of (a) the sheet resistance of the wafer and (b) the power density of the photovoltaic cell made from said wafer, the acidic treatment solution comprising a mixture of:
a buffered oxide etch (BOE) solution of:
from about 0.1 to about 20% by weight of at least one tetraalkylammonium hydroxide,
from about 0.1 to about 5% by weight acetic acid,
from about 0.1 to about 5% by weight of at least one non-ionic surfactant,
about 0.1 to about 5% by weight of at least one metal chelating agent,
from about 0.1 to about 20% by weight of a metal free source of ammonia ions,
from about 0.01 to about 20% by weight of a metal free source of fluoride ions,
balance water to 100%, mixed with a solution of oxidizer and optionally water in a ratio of oxidizer solution/water/BOE solution of 0.01-10/0-100/1.

15. An acidic treatment solution according to claim 14 wherein the oxidizer solution comprises hydrogen peroxide.

16. An acidic treatment solution according to claim 14 wherein BOE solution has a pH of from about 3 to about 6.

17. An acidic treatment solution according to claim 16 wherein the BOE solution has a pH of from about 4.3 to about 5.

18. An acidic treatment solution according to claims 14 wherein the BOE solution comprises tetramethylammonium hydroxide as the tetraalkylammonium hydroxide, 3,5-dimethylhex-1-yn-3-ol as the at least one surfactant, and EDTA as the at least one metal chelating agent, and the oxidizer solution comprises hydrogen peroxide and water.

19. An acidic treatment solution according to claim 18 wherein the BOE solution comprises about 3.1% tetramethylammonium hydroxide, about 1.2% acetic acid, about 2.1% HF, about 0.8% 3,5-dimethylhex-1-yn-3-ol about 0.8% ammonium hydroxide, about 0.6% EDTA, about 91.5% water.

20. An acidic treatment solution according to claim 19 wherein the BOE solution is mixed with the oxidiser solution in a ratio of BOE/water/30% hydrogen peroxide solution within the range 1/6/0.2-1.0.

21. An acidic treatment solution according to claim 19 wherein the BOE solution is mixed with oxidizer solution in a ratio of BOE/water/30% hydrogen peroxide solution of about 1/6/0.2.

22. An acidic treatment solution according to claim 19 wherein the BOE solution is mixed with oxidizer solution in a ratio of BOE/water/30% hydrogen peroxide solution of about 1/6/0.8.

23. An acidic treatment solution according to claim 19 wherein the BOE solution is mixed with oxidizer solution in a ratio of BOE/water/30% hydrogen peroxide solution of about 1/6/1.

\* \* \* \* \*

UNITED STATES PATENT AND TRADEMARK OFFICE
CERTIFICATE OF CORRECTION

PATENT NO. : 8,366,954 B2
APPLICATION NO. : 13/138144
DATED : February 5, 2013
INVENTOR(S) : Joannes T. V. Hoogboom et al.

Page 1 of 1

It is certified that error appears in the above-identified patent and that said Letters Patent is hereby corrected as shown below:

ON THE TITLE PAGE:

IN THE ABSTRACT:

Line 6:
    Now reads:    "of he wafer"
    Should read:  -- in the wafer --

IN THE SPECIFICATION:

Column 6, line 18:
    Now reads:    "and the like."
    Should read:  -- and the like). --

Column 7, line 11:
    Now reads:    "were the measured"
    Should read:  -- were then measured --

IN THE CLAIMS:

In Claim 6 - Column 10, line 20:
    Now reads:    "-1-yn3-ol"
    Should read:  -- -1-yn-3-ol --

Signed and Sealed this
Twentieth Day of August, 2013

Teresa Stanek Rea
*Acting Director of the United States Patent and Trademark Office*